United States Patent
Kim et al.

(10) Patent No.: US 7,840,003 B2
(45) Date of Patent: Nov. 23, 2010

(54) HIGH-SPEED GCM-AES BLOCK CIPHER APPARATUS AND METHOD

(75) Inventors: Kwang Ok Kim, Chunlabook-do (KR); Kyeong Soo Han, Daejeon (KR); Tae Whan Yoo, Daejeon (KR); Yool Kwon, Busan (KR)

(73) Assignee: Electronics and Telecommunications Research Institute (KR)

( * ) Notice: Subject to any disclaimer, the term of this patent is extended or adjusted under 35 U.S.C. 154(b) by 1610 days.

(21) Appl. No.: 11/116,675

(22) Filed: Apr. 27, 2005

(65) Prior Publication Data

US 2006/0126835 A1 Jun. 15, 2006

(30) Foreign Application Priority Data

Dec. 13, 2004 (KR) .................. 10-2004-0104925

(51) Int. Cl.
 H04L 9/00 (2006.01)
(52) U.S. Cl. ........................... 380/44; 380/28
(58) Field of Classification Search ............. 370/353, 370/389; 380/37, 259, 28; 726/22
See application file for complete search history.

(56) References Cited

U.S. PATENT DOCUMENTS

| | | | | |
|---|---|---|---|---|
| 5,054,067 A * | 10/1991 | Moroney et al. | ............. | 380/37 |
| 7,260,217 B1 * | 8/2007 | Carlson | ................. | 380/37 |
| 7,274,695 B2 * | 9/2007 | Kim et al. | ................. | 370/389 |
| 7,418,100 B2 * | 8/2008 | McGrew et al. | ............. | 380/28 |
| 2001/0021253 A1 * | 9/2001 | Furuya et al. | ............. | 380/259 |
| 2003/0137975 A1 * | 7/2003 | Song et al. | ................. | 370/353 |
| 2003/0198345 A1 * | 10/2003 | Van Buer | ................. | 380/43 |
| 2005/0047592 A1 * | 3/2005 | Lim | ............. | 380/28 |
| 2006/0112431 A1 * | 5/2006 | Finn et al. | ................. | 726/22 |

OTHER PUBLICATIONS

Kuo, H; A 2.29 Gbits/sec, 56 mW non-pipelined Rijndael AES encryption IC in a 1.8 V, 0.18 μm CMOS technology; Publication Date: 2002; Dept. of Electr. Eng., California Univ., Los Angeles, CA; On pp. 147-150.*
"The Galois/Counter Mode of Operation (GCM)" May 31, 2005, David A. McGrew and John Viega, 44 pp.

* cited by examiner

*Primary Examiner*—Kambiz Zand
*Assistant Examiner*—Amare Tabor
(74) *Attorney, Agent, or Firm*—Blakely, Sokoloff, Taylor & Zafman (57) ABSTRACT

A high-speed Galois Counter Mode-Advanced Encryption Standard (GCM-AES) block cipher apparatus and method is provided. The apparatus can operate at a low clock frequency of 125 MHz and provide a 2 Gbps link encryption function in an Optical Line Termination (OLT) and an Optical Network Unit (ONU) of an Ethernet Passive Optical Network (EPON). 11-round block cipher of 128- bit input data is implemented using an 8-round Counter-AES (CTR-AES) block cipher module and a 3-round CTR-AES block cipher module, so that it is possible to provide a 1 Gbps link security function for an input frequency of 62.5 MHz and a 2 Gbps link security function for an input frequency of 125 MHz.

7 Claims, 6 Drawing Sheets prior art
FIG. 1 prior art
FIG. 2 prior art
FIG. 3

HIGH-SPEED GCM-AES BLOCK CIPHER APPARATUS AND METHOD

RELATED APPLICATION

The present application is based on, and claims priority from, Korean Application Number 2004-104925, filed Dec. 13, 2004, the disclosure of which is incorporated by reference herein in its entirety.

BACKGROUND OF THE INVENTION

1. Field of the Invention

The present invention relates to a high-speed Galois Counter Mode-Advanced Encryption Standard (GCM-AES) block cipher apparatus and method, which makes it possible to operate at a low clock frequency of 125 MHz and provide a 2 Gbps link security function in an Optical Line Termination (OLT) and an Optical Network Unit (ONU) of an Ethernet Passive Optical Network (EPON).

2. Description of the Related Art

The US NIST (National Institute of Standards and Technology) has selected a next-generation symmetric key block cipher algorithm "Rijndael" as an Advanced Encryption Standard (AES) algorithm. The AES is an encryption standard in which encryption is performed for a fixed block size of 128 bits during 11 rounds using respective round keys of 128 bits. Processing and computation of the AES is performed through 9 repetitive rounds and the final round after AddRound-Key. Each of the rounds other than the final round includes ByteSub, ShiftRow, MixColumn, and AddRound-key module. The AES block cipher algorithm supports the Electronic Codebook (ECB), Cipher Block Chaining (CBC), Cipher Feedback (CFB), Offset Feedback (OFB), or Counter (CTR) modes according to an operation mode. The CTR mode provides the fastest encryption function and provides the encryption function even for a variable-length data.

IEEE802.3ah EFM complies with the MAC security standard proposed in the IEEE802.1AE working group to provide a link security function in an Ethernet Passive Optical Networks (EPON). The IEEE802.1AE working group has adopted the operation mode of a GCM-AES block cipher to provide both data encryption and frame authentication functions in the link layer.

The adopted GCM-AES block cipher can provide either the authenticated encryption/decryption or authentication tag generation/verification function according to an operation. The GCM-AES block cipher provides a high-speed encryption function for a variable-length MAC frames using a 128-bit CTR-AES block cipher algorithm, and provides a frame authentication function using a universal hashing algorithm. Also, current the GCM-AES is free of intellectual property restrictions.

Figure 1:
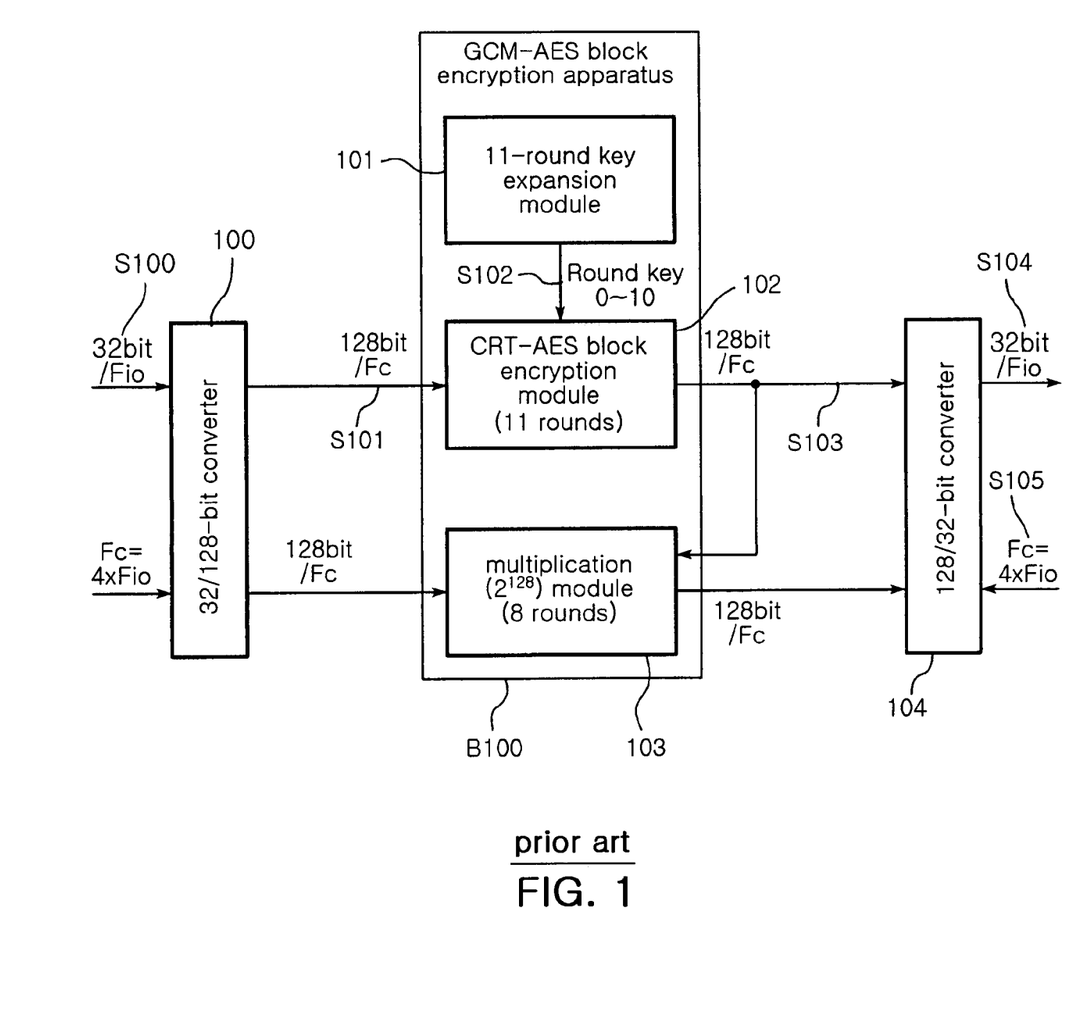
FIG. 1 is a block diagram of a conventional GCM-AES block cipher apparatus.

FIG. 1 is a block diagram of a conventional GCM-AES block cipher apparatus.

As shown in FIG. 1, the conventional GCM-AES block cipher apparatus B100 comprises an 11-round key expansion module 101, an 11-round CTR-AES block cipher module 102, and an 8-round GF multiplication module 103.

In FIG. 1, a 32/128-bit converter 100 and a 128/32-bit converter 104 are data conversion interface modules for providing an interface between a MAC module and a MAC controller module.

The key expansion module 101 generates 11 round keys of 128 bits (s102) for use in CTR-AES block cipher using a 128-bit key that is received every MAC frame. The CTR-AES block cipher module 102 encrypts a 128-bit data block s101 of a MAC frame received from the 32/128-bit converter 100 using the 128-bit round keys s102 received from the key expansion module 101 (s103). Here, the GF multiplication module 103 generates an authentication value of the MAC frame using a hash key calculated from the round keys.

A clock frequency Fio of input/output data is used to pass data in an EPON OLT/ONU, and a clock frequency Fc, which is four times the clock frequency Fio, is used in the GCM-AES block cipher apparatus B100.

32-bit data s100 are input to the 32/128-bit converter 100 at the Fio clock frequency. The 32/128-bit converter 100 multiplexes the four input 32-bit data s100 to convert them into a 128-bit data s101 at the Fc clock frequency. Such 128-bit data s101 are encrypted in the GCM-AES block encryption apparatus B100 at the Fc clock frequency. The encrypted 128-bit data are input to the 128/32-bit converter 104. The 128/32-bit converter 104 demultiplexes the input 128-bit data into 32-bit data s104 at the Fio clock frequency.

The GCM-AES block encryption apparatus B100 performs its processing during 11 rounds in a pipeline manner. However, in order to encrypt consecutively input data blocks, the converters 100 and 104 requires an Fc clock frequency, which is four times the input/output data clock frequency Fio according to an inequality shown in Expression 1, since the converters 100 and 104 must maintain the relationship of multiples of 4 between Fio clock frequency and Fc clock frequency for clock synchronization.

$$\frac{Fc}{Fio} \times \text{cycle} \geq 11 \text{ rounds,} \qquad \text{[Expression 1]}$$

where $$\text{cycle} = \frac{128}{Wd},$$

Fio×Wd=EPON Data Rate, "Fc" is the clock frequency of the GCM-AES block cipher module, "Fio" is the input/output data clock frequency, "Wd" is an input/output data bus width, and "cycle" is the number of clock cycles required to input 128 bits.

Figure 2:
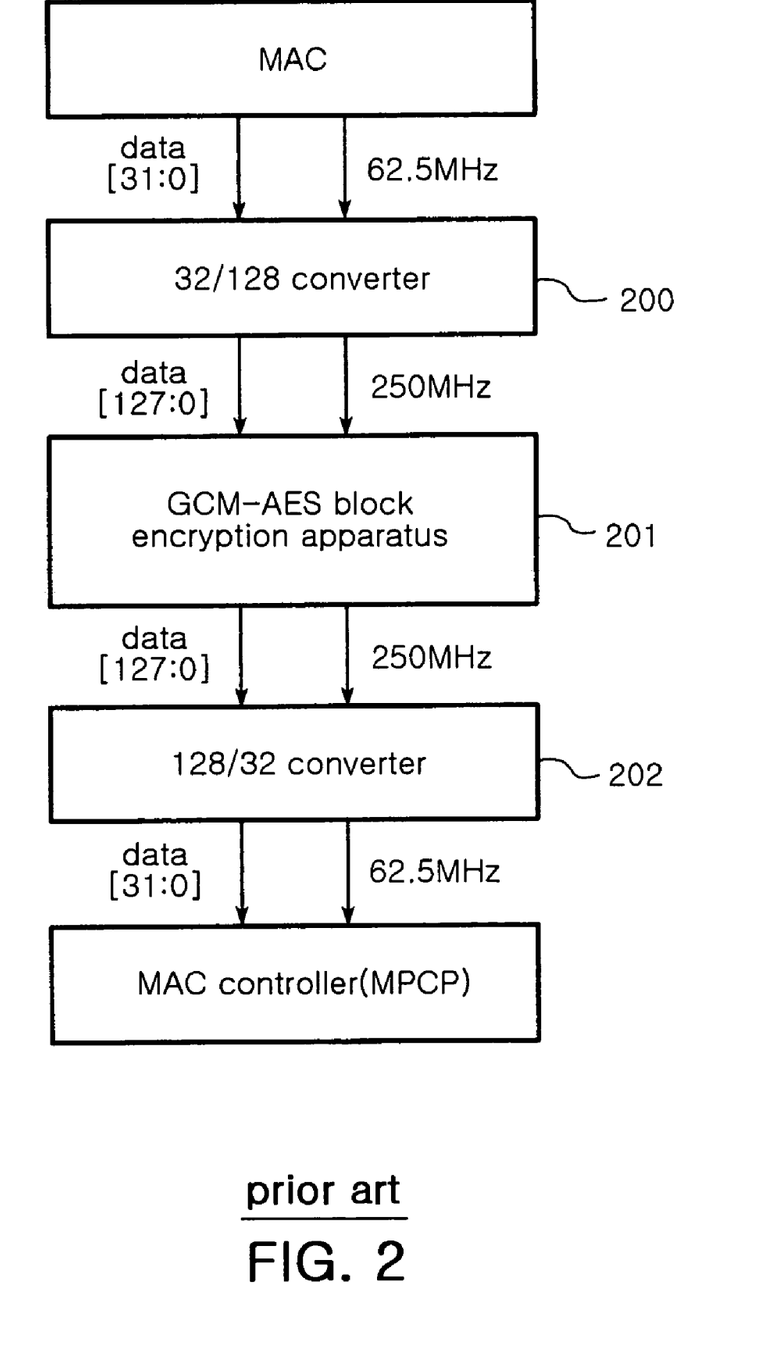
FIG. 2 is a diagram illustrating an internal interface structure of a 2 Gbps EPON OLT/ONU when the conventional GCM-AES block cipher apparatus is applied to the 2 Gbps EPON OLT/ONU.

Accordingly, as shown in FIG. 2, if 62.5 MHz is used as the input/output data clock frequency in a 2 Gbps EPON OLT/ONU, a GCM-AES block cipher apparatus 201 uses a clock frequency of 250 MHz, which is four times the input/output data clock frequency.

In the conventional GCM-AES block cipher apparatus, the relationship between the data bus width and the clock frequency in the 1 Gbps or 2 Gbps EPON OLT/ONU is shown in Table 1.

TABLE 1

| Data Rate | Fc | Fio | Wd | Fc/Fio(a) | Cycle(b) | Round(a)*(b) |
|---|---|---|---|---|---|---|
| 1 Gbps | 125 MHz | 31.25 MHz | 32bits | 4 | 4 | 16 |
|  | 125 MHz | 62.5 MHz | 16bits | 2 | 8 | 16 |
|  | 125 MHz | 125 MHz | 8bits | 1 | 16 | 16 |
| 2 Gbps | 250 MHz | 31.25 MHz | 64bits | 8 | 2 | 16 |
|  | 250 MHz | 62.5 MHz | 32bits | 4 | 4 | 16 |
|  | 250 MHz | 125 MHz | 16bits | 2 | 8 | 16 |
|  | 250 MHz | 250 MHz | 8bits | 1 | 16 | 16 |
|  | 125 MHz | 125 MHz | 16bits | 1 | 8 | 8 |
|  | 125 MHz | 62.5 MHz | 32bits | 2 | 4 | 8 |
|  | 125 MHz | 31.25 MHz | 64bits | 4 | 2 | 8 |

As shown in Table 1, the conventional GCM-AES block cipher structure must use a clock frequency of 250 MHz in the 2 Gbps EPON system environment in order to meet a requirement of more than 11 rounds under any circumstance. Using such a high clock frequency causes much difficulty in actual hardware implementation.

Figure 3:
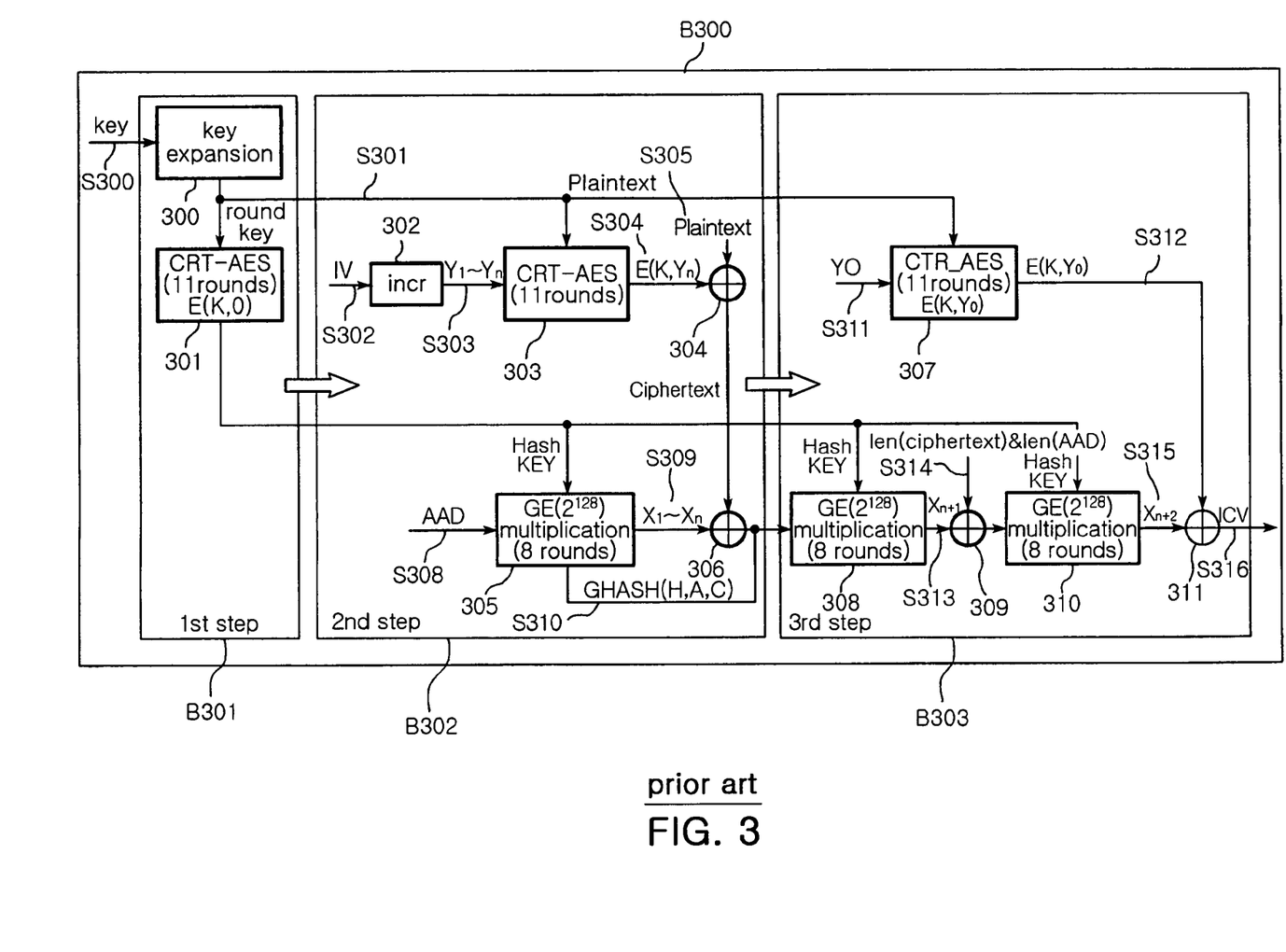
FIG. 3 is a signal process diagram illustrating an encryption method in the conventional GCM-AES block cipher apparatus.

FIG. 3 is a signal process diagram illustrating an encryption method in the conventional GCM-AES block cipher apparatus. In FIG. 3, a conventional GCM-AES block cipher module B300 performs three main steps of processing (B301, B302 and B303) for a variable-length MAC frames.

At the first step (B301), the key expansion module 101 expands a 128-bit key s300 received together with a MAC frame to produce 11 round keys for use s301 in encryption of the MAC frame (300), and the 11-round CTR-AES encryption module 102 generates a hash key value s307 from the generated round keys s301 (301).

The hash key value is calculated using an equation expressed in Expression 2.

$$H=E_{11rounds}(K,0^{128}),$$ [Expression 2]

Where "K" denotes the round key and "H" denotes the hash key value.

While the first step (B301) is performed, 32-bit input data of the MAC frame are multiplexed into a 128-bit data in the 32/128-bit converter 100.

Next, at the second step (B302), 128-bit data blocks of the MAC frame are encrypted or decrypted, and an authentication value of the encrypted data blocks is also produced or an authentication value of the decrypted data blocks is compared with input authentication value.

In order to generate the authentication value, the GE multiplication module 103 receives the first 128-bit data block of the MAC frame as an Additional Authenticated Data (AAD) value s308, and computes a product s309 of the received ADD value and the hash key value s307 produced at the first step (B301) (305). The product s309 is XORed with an encrypted value s306 of the input data block (306), and the XOR result value is feedback to the GF multiplication module 103 to repeat the computation.

In addition, in order to perform encryption, a 96-bit random Initial Vector (IV) value s302 is combined with a 32-bit data block counter (302) to produce a 128-bit counter value s303. The 128-bit counter value s303 is input to the 11-round CTR-AES block encryption module 102 and is then encrypted using the round key s301 calculated at the first step (B301) (303). The encrypted value s304 is XORed with a 128-bit data block s305 (304) to be output as an encrypted value s306 of the input data blocks.

This second step (B302) is repeated for all 128-bit data blocks of the MAC frame as shown in Expression 3.

$$Y_o=IV\|0^{31}, Y_i=INCR(Y_{i-1}) \text{ for } i=1,\ldots,n$$

$$C_i=P_i \oplus E_{11rounds}(K,Y_i) \text{ for } i=1,\ldots,n-1$$

$$C^*_n=P^*_n \oplus MSB(E_{11rounds}(K,Y_n))$$ [Expression 3]

where "$Y_i$" denotes the 128-bit counter value, "$P_i$" denotes the 128-bit input data block, "$C_i$" denotes the encrypted value of the input data block $P_i$, and "$C^*_n$" denotes data encryption of a final bit string remaining after the MAC frame is divided into 128-bit data blocks.

Finally, at the third step (B303), the GF multiplication module 103 receives the authentication value s310 repeatedly calculated for the data block s306 encrypted at the second step (B302), and performs two multiplications of the received authentication value s310 and the hash key value to calculate a final authentication value s316.

Specifically, the 11-round CTR-AES block cipher module 102 receives the 128-bit counter value s311 obtained by combining a 96-bit IV value and a 32-bit zero value, and encrypts the received 128-bit counter value s311 into a round key s301 (s312). Then, the GF multiplication module 103 computes a product of the hash key value s307 and the authentication value s310 calculated at the second step B302 (308), and then performs an XOR operation between the product and a value s314 obtained by combining the encrypted value of the last data block and the AAD value (309). The GF multiplication module 103 again computes a product of the XOR result value and the hash key value s307 (310), and then performs an XOR operation (311) between the product and the encrypted value s312 obtained at the third step (B303) to calculate a final authentication value ICV (s316).

The calculated final authentication value ICV is expressed by an equation shown in Expression 4.

$$ICV=MSB(GHASH(H,A,C) \oplus MSB(E_{11rounds}(K,Y_0))$$ [Expression 4]

As described above, since the conventional GCM-AES cipher apparatus must operate at a frequency, which is four times the input/output data clock frequency, it must operate at a high clock frequency of 250 MHz in a 2 Gbps EPON environment. This makes it difficult to implement an EPON OLT/ONU through an FPGA. In addition, even if an EPON OLT/ONU is developed through an ASIC, a 0.13 μm process must be performed to guarantee the processing of data at a high clock frequency, which increases chip costs and makes it difficult to implement hardware.

Thus, to easily implement the module in the hardware of an EPON OLT/ONU, it is necessary to provide a new structure of the GCM-AES block cipher module that can operate at a lower frequency.

SUMMARY OF THE INVENTION

Therefore, the present invention has been made in view of the above problems, and it is an object of the present invention to provide a high-speed GCM-AES block cipher apparatus which is applied to an OLT/ONU in a 1 Gbps or 2 Gbps EPON and which can operate at a lower clock frequency to provide a 1 Gbps or 2 Gbps link security function.

In accordance with one aspect of the present invention, the above and other objects can be accomplished by the provision of a high-speed GCM-AES block cipher apparatus for providing a data authenticated encryption/decryption or only a frame authentication tag generation/verification function in an EPON environment, the apparatus comprising: a key expansion module for generating 11 round keys of 128 bits for use in encryption using a 128-bit key that is input every MAC frame; an 8-round CTR-AES block encryption module for encrypting 128 bit data blocks of a MAC frame in a pipeline manner during 8 rounds using 0th to 7th round keys of the 11 round keys generated by the key expansion module; a 3-round CTR-AES block encryption module for encrypting the 128-bit data blocks encrypted in the 8-round CTR-AES block encryption module during 3 rounds using 8th to 10th round keys of the 11 round keys generated by the key expansion module; and a GF multiplication module for calculating an authentication parameter of the MAC frame from a hash key calculated using the round keys generated by the key expansion module.

In accordance with another aspect of the present invention, there is provided a high-speed GCM-AES block cipher method comprising: expanding a 128-bit key, which is input every MAC frame, into round keys required for 11-round encryption; calculating a hash key value using the round keys; performing a first encryption step for encrypting 128-bit data blocks of a MAC frame using the 128-bit round keys during 8 rounds; performing a second encryption step for encrypting the encrypted data blocks using the expanded 128-bit round keys during 3 rounds; and calculating an authentication parameter of the MAC frame using the calculated hash key value and a result of the second encryption step.

Preferably, the expansion of the 128-bit key comprises expanding a 128-bit key, which is input every MAC frame, into 0th to 10th round keys; and providing the expanded 0th to 7th round keys to the first encryption step and providing the expanded 8th to 10th round keys to the second encryption step.

In this manner, the high-speed GCM-AES block cipher apparatus provides a frame authenticated encryption function and a frame authentication function for a 1 Gbps or 2 Gbps EPON.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Preferred embodiments of the present invention will now be described in detail with reference to the accompanying drawings.

Figure 4:
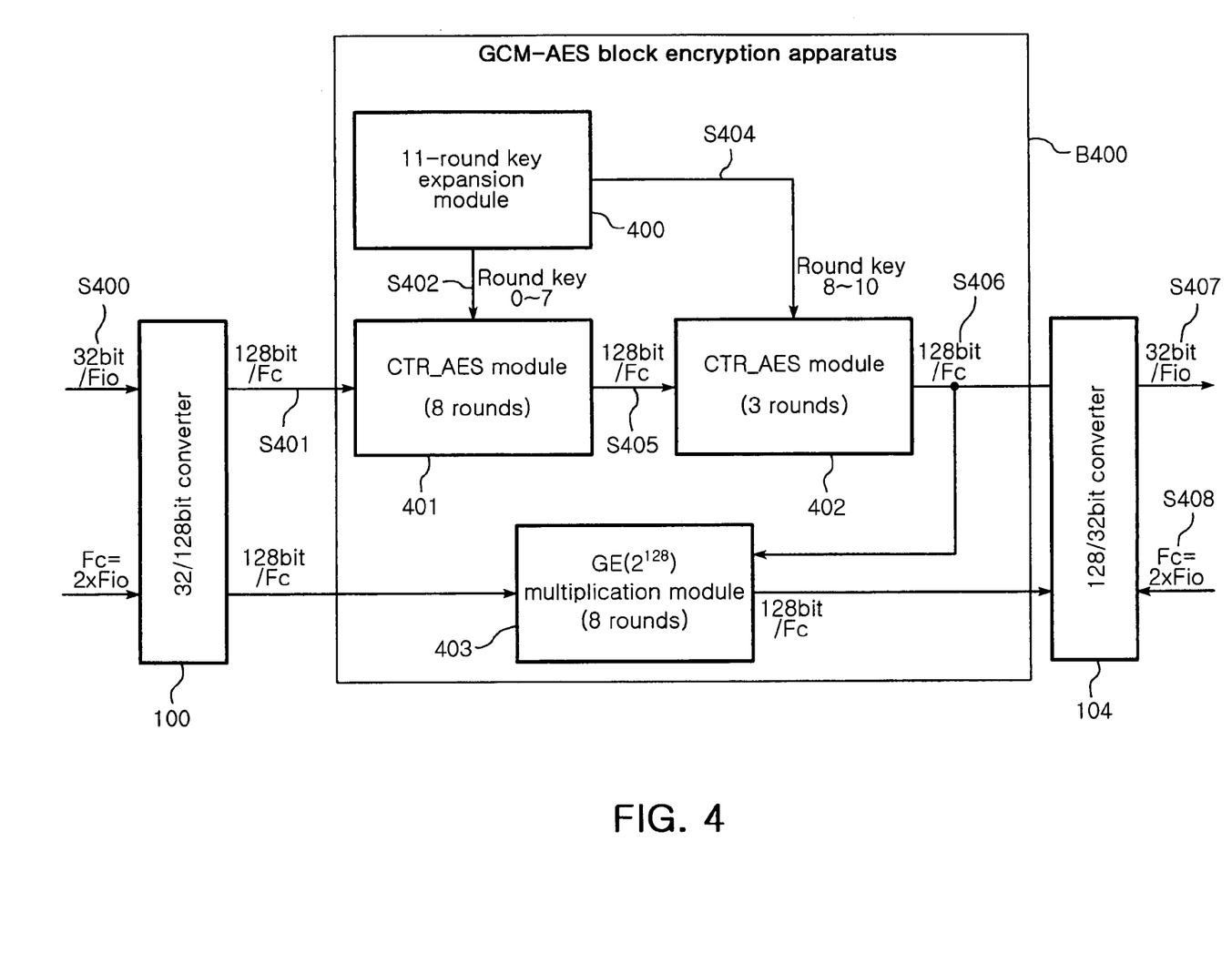
FIG. 4 is a block diagram of a high-speed GCM-AES block cipher apparatus according to the present invention.

FIG. 4 is a block diagram of a high-speed GCM-AES block cipher apparatus according to the present invention.

As shown in FIG. 4, the high-speed GCM-AES block cipher apparatus B400 according to the present invention comprises an 11-round key expansion module 400, an 8-round CTR AES block cipher module 401, a 3-round CTR-AES block cipher module 402, and an 8-round GF multiplication module 403.

The present invention is characterized in that 11-round CTR-AES block cipher is implemented using the 8-round CTR-AES block cipher module 401 and the 3-round CTR-AES block cipher module 402, thereby reducing the maximum number of rounds and thus reducing the clock frequency.

In the high-speed GCM-AES block cipher apparatus B400, the key expansion module 400 generates 11 round keys of 128 bits s402 and s404 for use in encryption in the two CTR-AES block cipher modules 401 and 402 using a 128-bit key that is input every MAC frame. In the 11 round keys, 0th to 7th round keys s402 are transferred to the 8-round CTR-AES block cipher module 401, the remaining 8th to 10th round keys s404 are transferred to the 3-round CTR-AES block cipher module 402.

The 8-round CTR-AES block cipher module 401 encrypts a 128-bit data block using the 0th to 7th round keys s402 generated by the key expansion module 400 during 8 rounds. Then, the 3-round CTR-AES block cipher module 402 again encrypts the 128-bit data blocks 405 encrypted in the 8-round CTR-AES block cipher module 401 using the 8th to 10th round keys s404 generated by the key expansion module 400 during 3 rounds.

The 8-round CTR-AES block cipher module 401 and the 3-round CTR-AES block cipher module 402 operate in parallel with each other. Here, the GF multiplication module 403 generates an authentication value of the MAC frame using a hash key.

The high-speed GCM-AES block cipher apparatus B400 configured as described above uses an Fc clock frequency s408, which is twice a Fio clock frequency s400 and s407 of the input MAC frame. Since the maximum number of rounds of the two CTR-AES block cipher modules 401 and 402 provided in the high-speed GCM-AES block cipher module B400 is 8, it is possible to use an Fc clock frequency, which is twice the Fio clock frequency as expressed by an inequality shown in Expression 5 when sequentially encrypting data blocks through the high-speed GCM-AES block cipher module B400.

$$\frac{Fc}{Fio} \times \text{cycle} \geq 8 \text{ rounds,} \qquad \text{[Expression 5]}$$

Where "cycle" is the number of clock cycles required to input 128 bits, $$\text{cycle} = \frac{128}{Wd},$$

"Wd" is an input/output data bus width, Fio×Wd=EPON Data Rate(Wd=32), "Fc" is the clock frequency of the high-speed GCM-AES block cipher module, and "Fio" is the input/output data clock frequency.

Figure 5:
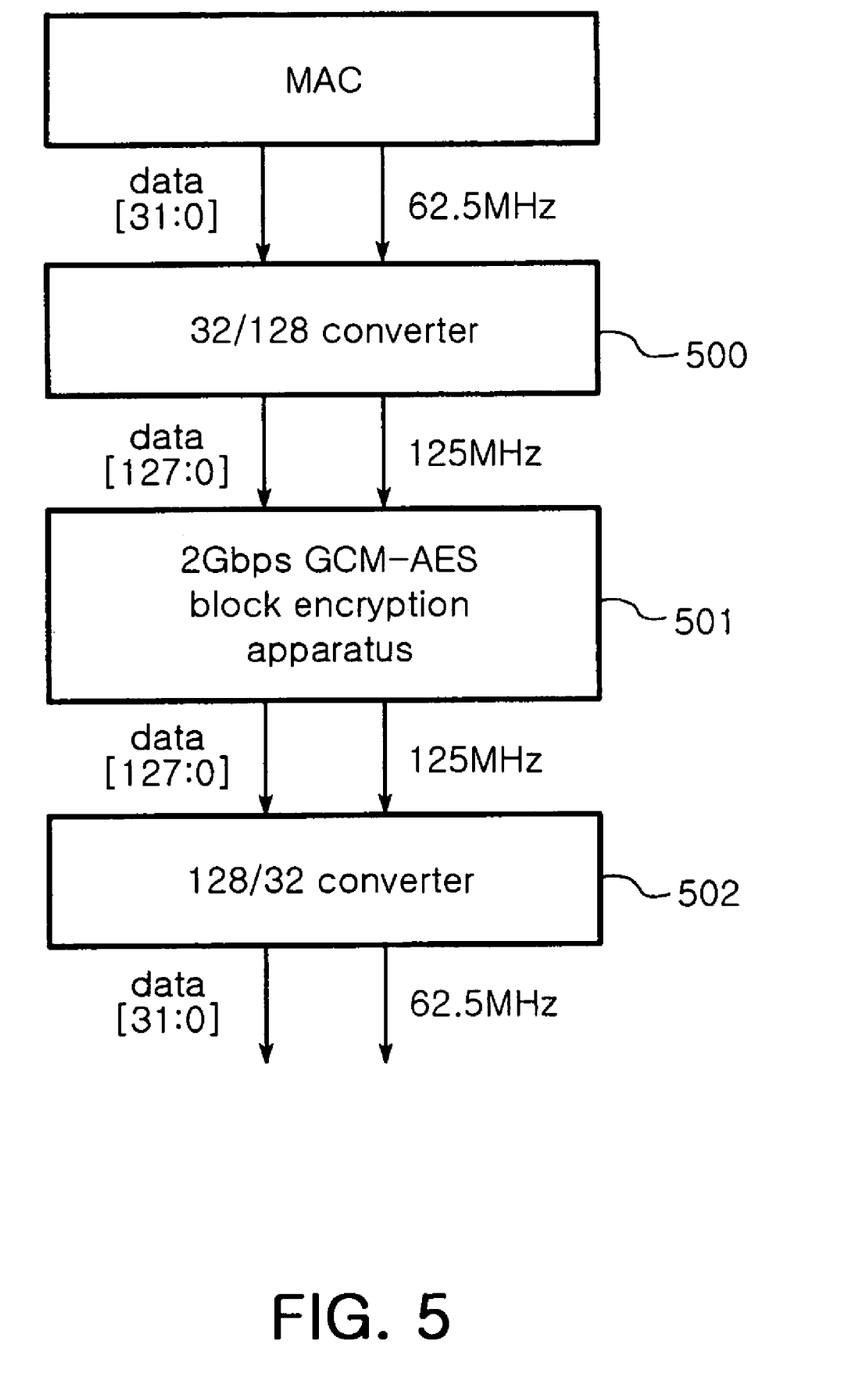
FIG. 5 is a diagram illustrating an internal interface structure of a 2 Gbps EPON OLT/ONU when the high-speed GCM-AES block cipher apparatus according to the present invention is applied to the 2 Gbps EPON OLT/ONU.

FIG. 5 is a diagram illustrating an internal interface structure of a 2 Gbps EPON OLT/ONU when the high-speed GCM-AES block cipher apparatus according to the present invention is applied to the 2 Gbps EPON OLT/ONU.

As shown in FIG. 5, if 62.5 MHz is used as a clock frequency of input/output data in the 2 Gbps EPON OLT/ONU, the high-speed GCM-AES block cipher apparatus 501 uses a clock frequency of 125 MHz, which is twice the input/output data clock frequency.

The relationship between the data bus width "Wd" and the clock frequency "Fc" in the high-speed GCM-AES block cipher apparatus according to the present invention in the 1 Gbps or 2 Gbps EPON OLT/ONU is shown in Table 2.

TABLE 2

| Data Rate | Fc | Fio | Wd | Fc/Fio(a) | Cycle(b) | Round(a)*(b) |
|---|---|---|---|---|---|---|
| 1 Gbps | 62.5 MHz | 31.25 MHz | 32bit | 2 | 4 | 8 |
|  | 62.5 MHz | 62.5 MHz | 16bit | 1 | 8 | 8 |
| 2 Gbps | 125 MHz | 31.25 MHz | 64bit | 4 | 2 | 8 |
|  | 125 MHz | 62.5 MHz | 32bit | 2 | 4 | 8 |
|  | 125 MHz | 125 MHz | 16bit | 1 | 8 | 8 |

As shown in Table 2, the high-speed GCM-AES block cipher apparatus 501 according to the present invention, which is used to implement link security in the environment of the 2 Gbps EPON system, can operate at a clock frequency of 125 MHz in any case. If the clock frequency is reduced in this manner, it is easy to implement the block cipher apparatus through an FPGA and an ASIC, and it is also possible to guarantee the data that is transferred at the clock frequency.

A high-speed GCM-AES block cipher method according to the present invention, which uses the above cipher apparatus, comprises expanding a 128-bit key, which is input every MAC frame, into round keys required for 11-round encryption; calculating a hash key value using the round keys; performing a first encryption step for encrypting 128-bit data blocks of a MAC frame using the 128-bit round keys during 8 rounds; performing a second encryption step for encrypting the encrypted data blocks using the expanded 128-bit round keys during 3 rounds; and calculating an authentication parameter of the MAC frame using the calculated hash key value and a result of the second encryption step.

That is, according to the present invention, the 11-round encryption of input data blocks is performed through the first encryption step and the second encryption step.

Figure 6:
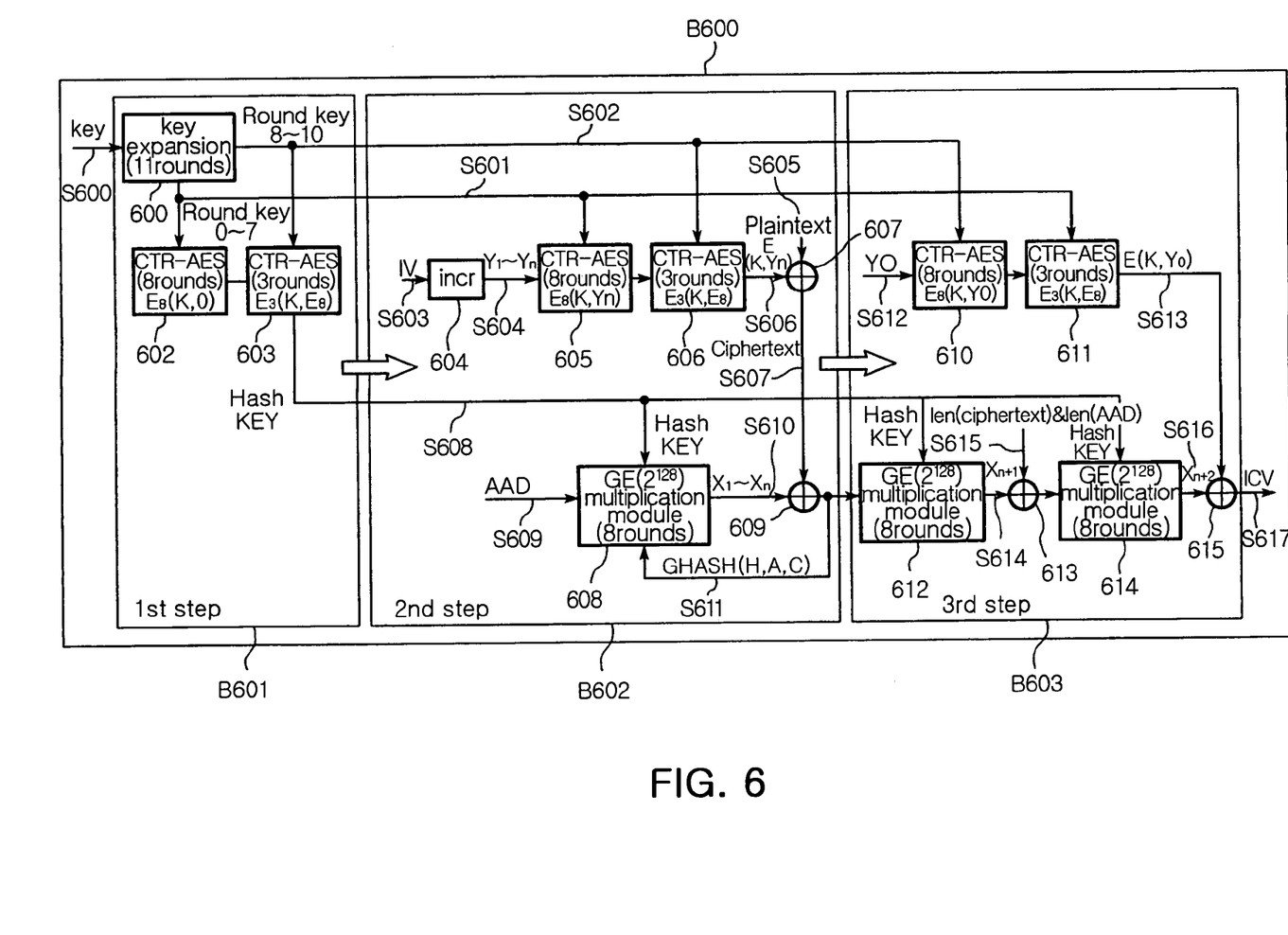
FIG. 6 is a signal process diagram illustrating a high-speed GCM-AES block cipher method according to the present invention.

FIG. 6 is a signal process diagram illustrating a high-speed GCM-AES block cipher method according to the present invention. In FIG. 6, the high-speed GCM-AES block cipher method according to the present invention can be divided mainly into a first step (B601), a second step (B602), and a third step (B603), listed in the order in which they are performed. The key expansion is implemented through the first step (B601), the first and second encryption steps are implemented through the second step (B602), and the authentication parameter calculation is implemented through the first to third steps (B601 to B603).

The first step (B601) is the step of generating a round key required for encryption, in which the key expansion module 400 generates 11 round keys s601 and s602 using a 128-bit key s600 that is received every MAC frame from the 32/128-bit converter 100 (600), and the 8-round CTR-AES block cipher module 401 and the 3-round CTR-AES block cipher module 402 calculate a hash key value s608 for use in frame authentication using the generated round keys s601 and s602 as shown in Expression 6 (602 and 603).

$$H = E_{3rounds}(K', E_{8rounds}(K, 0^{128})), \qquad \text{[Expression 6]}$$

Where "K'" denotes 8th to 10th round keys s602, and "K" denotes 0th to 7th round keys s601.

If the round key and the hash key are generated as described above, the method proceeds to the second step (B602) in which 128-bit data blocks of the MAC frame are encrypted using the two CTR-AES block cipher modules 401 and 402, while an authentication value of the MAC frame is produced using the GF multiplication module 403.

The following is a more detailed description of how the second step (B602) is performed. The GF multiplication module 403 receives the first 128-bit data block of the MAC frame as an Additional Authenticated Data (AAD) value s609, and computes a product s610 of the received ADD value and the hash key value s608 produced at the first step (B601) (608). The product s610 is XORed with an encrypted data block value s607 (609), and the XOR result value s611 is input back to the GF multiplication module 403 to repeat the computation.

In the mean time, a 96-bit random Initial Vector (IV) value s603 is combined with a 32-bit data block counter (604) to convert the 96-bit random IV value s603 into a 128-bit counter value s604. The 128-bit counter value s604 is input to the 8-round CTR-AES block cipher module 401. The 8-round CTR-AES block cipher module 401 calculates an encrypted value of the 128-bit counter value s604 using the 128-bit counter value s604 and the round key s601 calculated at the first step (B601) (605). The encrypted value calculated in the 8-round CTR-AES block cipher module 401 is input back to the 3-round CTR-AES block cipher module 402 so that it is encrypted during the remaining 3 rounds of the 11 rounds of encryption (606).

An encrypted value s606 output from the 3-round CTR-AES block cipher module 402 is XORed with the 128-bit input data block s605 (607) to be output as an encrypted value s607 of the input data blocks.

The second step (B602) is repeated until all data blocks of the variable-length MAC frame are encrypted. This procedure is represented by Expression 7.

$$Y_o = IV \| 0^{31}, Y_i = INCR(Y_{i-1}) \text{ for } i=1,\ldots,n$$

$$C_i = P_i \oplus E_{3rounds}(K', E_{8rounds}(K, Y_i)) \text{ for } i=1,\ldots,n-1$$

$$C^*_n = P^*_n \oplus MSB(E_{3rounds}(K', E_{8rounds}(K, Y_n)))$$ [Expression 7]

where "$Y_i$" denotes the 128-bit counter value, "$P_i$" denotes the 128-bit input data block, "$C_i$" denotes the encrypted value of the input data block $P_i$, and "$C^*_n$" denotes data encryption of a final bit string remaining after the MAC frame is divided into 128-bit data blocks.

If encryption is completed for all of the data blocks input at the second step (B602), a final authentication parameter "ICV" is calculated for the encrypted MAC frame at the third step (B603).

More specifically, at the third step (B603), the 8-round and 3-round CTR-AES block cipher modules 401 and 402 perform 11-round encryption of 128-bit input data s612, obtained by combining a 96-bit IV value and a 32-bit zero value, using the round keys s601 and s602 (610 and 611).

Then, the GF multiplication module 403 computes a product s614 of the hash key value s608 calculated at the first step-(B601) and the authentication value s611 calculated at the second step (B602) (612), and then performs an XOR operation between the product s614 and a value s615 obtained by combining the encrypted value of the last data block and the AAD value (613). The GF multiplication module 403 again computes a product of the XOR result value and the hash key value s608 (614), and then performs an XOR operation (615) between the product and the encrypted value s613 of the 3-round CTR-AES block cipher module 402, which is obtained at the third step (B603), to output a final authentication value ICV of 128 bits (s617).

The final authentication parameter ICV output at the third step (B603) is expressed by an equation shown in Expression 8.

$$ICV = MSB(GHASH(H, A, C) \oplus MSB(E_{3rounds}(K', E_{8rounds}(K, Y_0))))$$ [Expression 8]

As apparent from the above description, the present invention provides a high-speed GCM-AES block cipher module which implements 11-round CTR-AES cipher through an 8-round CTR-AES block cipher module and a 3-round CTR-AES block cipher module that are connected in parallel, thereby making it possible to implement a link security function at a speed of 2 Gbps using a lower clock frequency. The implementation using the lower clock frequency makes it easy to develop hardware of the high-speed GCM-AES block cipher module through an FPGA or ASIC.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high-speed Galois Counter Mode-Advanced Encryption Standard (GCM-AES) block cipher apparatus for providing a data authenticated encryption/decryption, the apparatus comprising:

a key expansion module for generating 11 round keys of 128 bits for use in encryption using a 128-bit key that is input every MAC frame;

wherein a clock frequency at which the high-speed GCM-AES block encryption apparatus operates is twice the clock frequency required to input the MAC frame;

a 8-round Counter AES (CTR-AES) block cipher module for encrypting 128-bit data blocks of a Message Authentication Code (MAC frame) in a pipeline manner during 8 rounds using 0th to 7th round keys of the 11 round keys generated by the key expansion module;

a 3-round CTR-AES block cipher module for encrypting the 128-bit data blocks encrypted in the 8-round CTR-AES block cipher module during 3 rounds using 8th to 10th round keys of the 11 round keys generated by the key expansion module;

wherein the 8-round CTR-AES block cipher module and the 3-round CTR-AES block cipher module operate in parallel with each other; and a GF multiplication module for calculating an authentication parameter of the MAC frame from a hash key calculated using the round keys generated by the key expansion module.

2. The apparatus according to claim 1, wherein a clock frequency Fc, at which the high-speed GCM-AES block cipher apparatus operate, satisfies the following equation:

$$Fc/Fio \times cycle \geq 8 \text{rounds},$$

where "cycle" is the number of clock cycles required to input 128 bits, cycle=128/Wd, "Fio" is an input/output data clock frequency, Fio ×Wd =EPON Data Rate (Wd is an input/output data bus width), and "Fc" is the clock frequency at which the high-speed GCM-AES block encryption apparatus operates.

3. The apparatus according to claim 2, wherein the clock frequency Fc is 125 MHz.

4. A high-speed GCM-AES block cipher method comprising:

a high-speed GCM-AES apparatus performing the operations of:

expanding a 128-bit key, which is input every MAC frame, into round keys required for 11-round encryption;

calculating a hash key value using the round keys;

wherein a clock frequency at which the high-speed GCM-AES block encryption apparatus operates is twice the clock frequency required to input the MAC frame;

performing a first encryption step for encrypting 128- bit data blocks of a MAC frame using the 128- bit round keys during 8 rounds;

performing a second encryption step for encrypting the encrypted data blocks using the expanded 128- bit round keys during 3 rounds;

wherein the 8-round CTR-AES block cipher module and the 3-round CTR-AES block cipher module operate in parallel with each other; and calculating an authentication parameter of the MAC frame using the calculated hash key value and a result of the second encryption step.

5. The method according to claim 4, wherein the expansion of the 128- bit key comprises:

expanding a 128- bit key, which is input every MAC frame, into 0th to 10th round keys;

and providing the expanded 0th to 7th round keys to the first encryption step and providing the expanded 8th to 10th round keys to the second encryption step.

6. The method according to claim 4, wherein the hash key value is calculated by substituting the round keys into the following equation:

$$H = E_{3rounds}(K', E_{8rounds}(K, 0^{128})),$$

where "H" denotes the calculated hash key value, "K" denotes 0th to 7th round keys, and "K'" denotes 8th to 10th round keys.

7. The method according to claim 4, wherein the method is implemented at a clock frequency of 125 MHz in a 2 Gbps EPON environment.

* * * * *